May 10, 1966 P. L. DE LUCA 3,250,839
PROCESS FOR MAKING FIBROUS ARTICLES
Filed June 30, 1964 2 Sheets-Sheet 1
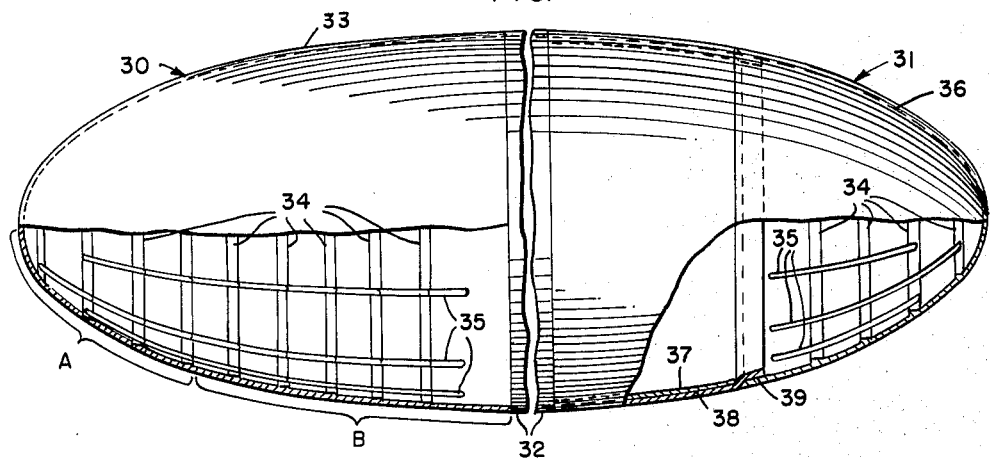
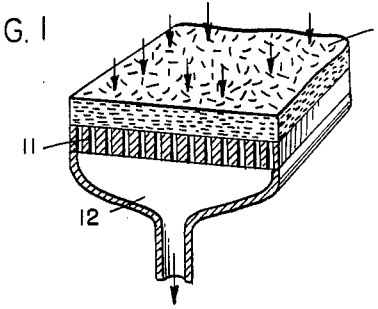
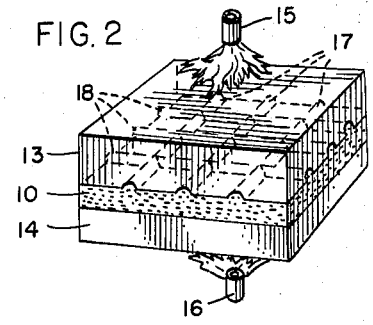
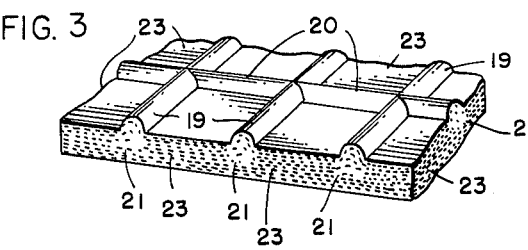
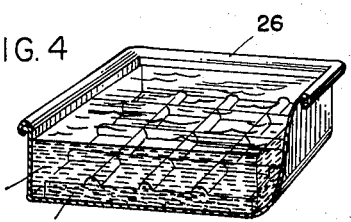
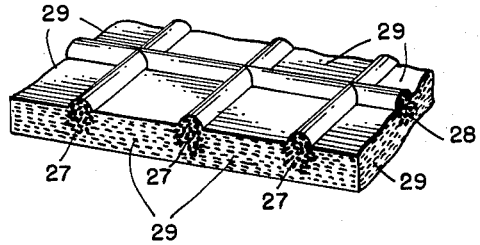
INVENTOR:
PETER L. DeLUCA
BY Marzall, Johnston,
Cook & Root
ATT'YS May 10, 1966 P. L. DE LUCA 3,250,839
PROCESS FOR MAKING FIBROUS ARTICLES
Filed June 30, 1964 2 Sheets-Sheet 2
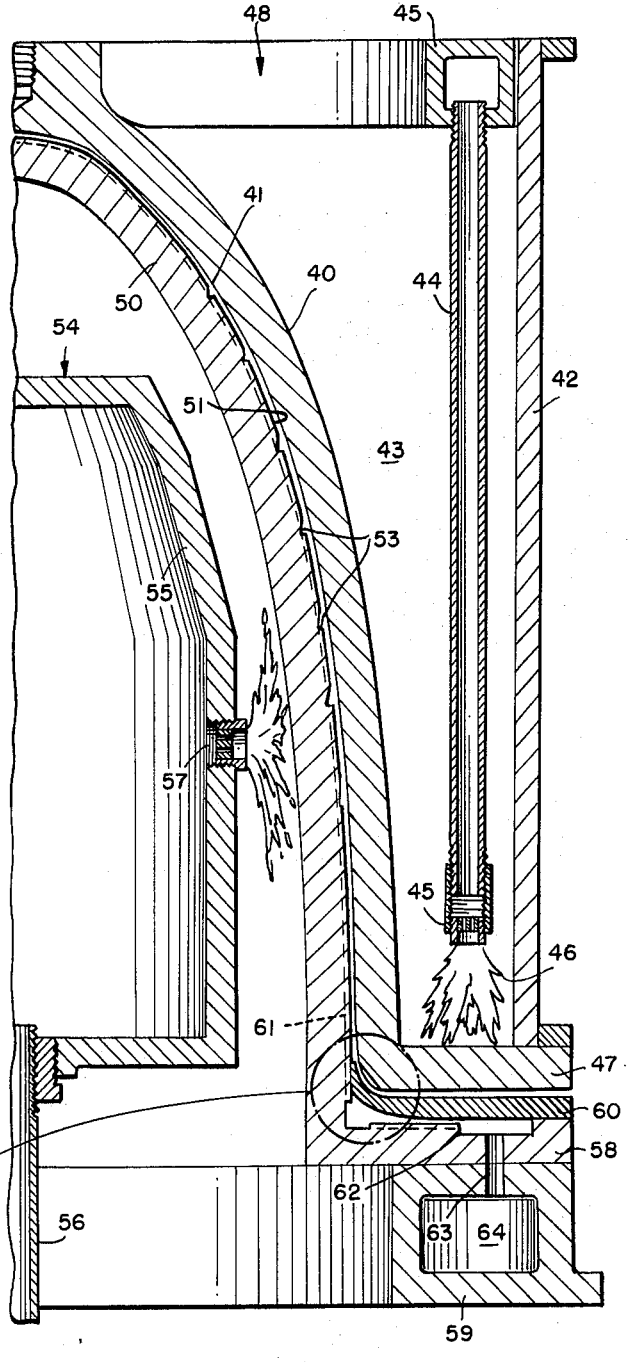
INVENTOR:
PETER L. DeLUCA
BY Marshall, Johnston,
Cook & Root
ATT'YS United States Patent Office 3,250,839
Patented May 10, 1966

3,250,839
PROCESS FOR MAKING FIBROUS ARTICLES
Peter L. De Luca, Elgin, Ill., assignor to Hawley Products Company, St. Charles, Ill., a corporation of Delaware
Filed June 30, 1964, Ser. No. 379,220
The portion of the term of the patent subsequent to July 14, 1981, has been disclaimed
8 Claims. (Cl. 264—119)

This application is a continuation-in-part of my application Serial No. 212,944, filed July 27, 1962, now U.S. 3,140,638.

This invention, in general, relates to processes for making fibrous articles having predetermined areas of fiber density materially different from fiber densities in other areas of the articles. More particularly, the invention relates to processes for forming articles of the aforesaid character by shaping, in a manner hereinafter more fully described, articles made from synthetic resin-impregnated fibers.

Briefly, the invention comprises preparing a preform of fibers, preferably resin-impregnated fibers, with a substantially uniform fiber density throughout and and subjecting the wet preform to pressure between opposing drying dies, at least one of which has one or more cavities in the surface contacting the preform. The cavity size is such that the fibers of the preform are distributed in the cavity area during drying whereby the areas of the preform adjacent the cavities form enlargements or projections on the surface of the preform. In so doing, the fiber distribution or density throughout these areas, i.e., in the enlargements or projections and preform portions therebeneath, becomes measurably less than the fiber densities in contiguous areas of the preform.

It is often advantageous to impregnate the fibers with a liquid form of synthetic resin after the fibers of the preform have been expanded into the cavities of the dies. By such technique, relatively greater proportions of resin flow into the areas of lower fiber density. Upon curing of a resin which cures into a relatively brittle resin, the latter areas are more brittle and frangible than the remaining areas of higher fiber density and lower relative proportion of resin.

It is a primary object of this invention to provide processes for producing fibrous articles having predetermined areas of fiber density materially different from fiber densities in other areas of said articles.

Another object is to provide new processes for producing fibrous articles having predetermined areas of greater frangibility than other areas of said articles.

Still another object is to provide processes for producing resin-impregnated fibrous articles having measurably different relative proportions of resin in predetermined areas thereof than the relative proportions of resin in other areas thereof.

Other objects, features and advantages of the invention will be apparent to those skilled in the art from the following description of preferred embodiments thereof, taken in conjunction with the drawings.

In the drawings:

FIG. 1 is a perspective, fragmentary illustration of the step of forming a fibrous preform.

FIG. 2 is a similar view of the step of forming areas of lower fiber density in the preform.

FIG. 3 is a fragmentary, perspective view of the preform produced by the step of FIG. 2.

FIG. 4 is a fragmentary, perspective illustration of the step of resin-impregnation.

FIG. 5 is a fragmentary, perspective view of the resin-impregnated preform.

FIG. 6 is a broken, side elevation, partly in section, of a rocket fairing produced by the processes of the invention.

FIG. 7 is a fragmentary, cross-section of male and female dies in operative relationship for producing the rocket fairing of FIG. 6.

FIG. 8 is a broken, front elevation of a quarter-section of the male die of FIG. 7, while FIG. 8A is a fragmentary, enlarged view of a fragment of said male die.

Referring to the drawings, the basic principles of the processes herein are illustrated in FIGS. 1–5. A fibrous preform 10 is formed of fibers such as wood cellulose fibers, glass fibers and/or like fibers. The preform 10 can be made by accreting fibers from an aqueous slurry thereof onto a porous screen or mold 11 having the desired shape. The fiber accretion may be achieved by drawing the water of the slurry through the porous screen into a header 12 until a matted, fibrous preform of the desired, usually uniform thickness is formed.

The moist preform may be transferred with all of its residual moisture or after partial drying to a machine having cooperating dies 13 and 14 between which the preform 10 is pressed. The dies 13 and 14 are heated dies, as shown symbolically by the fuel-burning members 15 and 16. The preform-contacting face of die 13 has a plurality of recesses, in this case a cross-network of grooves 17 and 18, providing spaces in said face into which the preform can expand under the application of heat and pressure. The moisture in the preform is vaporized under the heat from dies 13 and 14 and is drawn from between the dies. The fibers in the areas of the preform immediately contiguous to grooves 17 and 18 fill these grooves. This results in the creation of ribs or projections 19 and 20 on the surface of the preform and the simultaneous formation of zones or areas 21 and 22 throughout the thickness of the preform, which zones or areas have a lower fiber density than have the areas 23 between the ribs. This results because of localized movement of fibers in the areas immediate to the recesses whereby the fiber density in these areas becomes measurably less than in the areas 23.

The expanded preform as shown in FIG. 3 is dried to a moisture content not exceeding about 20% by weight in dies 13 and 14 by providing in the latter means for withdrawing the vapor formed upon heating the preform. The dried, expanded preform may then be impregnated with a liquid form of a synthetic resin such as a liquid resin precursor adapted to be cured into a hard resin or a solution of a resin polymer in an organic solvent. This step is shown symbolically in FIG. 4 wherein the expanded, dried preform 24 is illustrated as immersed in a body 25 of the liquid form resin in a vessel 26.

The resin-impregnation of the preform with areas of different fiber densities results in articles wherein the relative amounts of resin (ratio of resin to fibers) vary inversely to the fiber density of the article prior to resin impregnation. This is illustrated in FIG. 5 wherein the resin-impregnated areas 27 and 28, corresponding to preform areas 21 and 22 before impregnation, have a greater resin to fiber ratio than the resin to fiber ratio of resin-impregnated areas 29, corresponding to the preform areas 23 before impregnation.

Wood-cellulose fiber is a preferred type of fiber for purposes of the invention. Mixtures of cut bundles of glass filaments and cellulose fibers with resin additions can be accreted from aqueous slurries to produce stronger molded structures. Resin can be added also to give wet strength to the molded preform. Parez 607 (melamine-formaldehyde) is an example of a resin suitable for this purpose. The quantities used for this purpose are 0.5% to 5% by weight of the cellulose fiber. Such structures can contain, for example, 5–95% cut glass rovings, 95–5% cellulose fibers, based on the total weight of fibers, and 5–25% resin based on the weight of fibers. Other fibers which can be used include mica fibers, asbestos fibers, etc.

Suitable impregnating resins are, for example, the thermosetting phenol-formaldehyde and melamine-formaldehyde resins in isopropanol. Another example is phenol-formaldehyde resin in water-alcohol mixture, diluted with ethanol, 2-butanone or combinations thereof.

In the thermoplastic resin impregnation, a solution of resin in toluene or other organic solvent is typically used. The preferred resin to be used is a copolymer of styrene and minor amounts of butadiene (high impact polystyrene). Another useful resin is a terpolymer of styrene, acrylonitrile and butadiene. Yet another is polymerized methylmethacrylate.

A practical application for the process principles of the invention pertains to manufacture of fibrous articles having predetermined areas of less strength than for other areas. Fairings for aircraft rocket pods are an example of such articles.

Typically, a rocket launcher comprises an outer housing for a rocket which is attached to the underside of an aircraft wing. The housing is usually cylindrical in shape although it may have a series of planar sides. It is necessary to provide both nose and tail fairings for the launcher housing to reduce drag and smooth the air flow around the housing. This is particularly necessary with modern, super-sonic jet aircraft. The fairings so utilized must thus be structurally strong enough to withstand the considerable air pressures to which they are subjected and must also have the required aerodynamic characteristics.

When the rockets are fired from within the launcher housing, the fairings are broken, the nose fairing by the passage of the rocket and the tail fairing by the blast or exhaust gases from the rocket. Considerable difficulty has been encountered with the fragments, resulting from the break-up of the fairings, damaging various portions of the aircraft. Large fragments that have broken away from the nose fairing cause skin damage to the undersides of the wings; similarly, fragments from the tail fairing damage the horizontal stabilizers of the aircraft. A specific purpose of the invention is to provide processes for manufacture of nose and tail fairings which have the desired structural and aerodynamic properties but which will fragmentize without resultant damage to the aircraft.

FIG. 6 illustrates a nose cone fairing 30 and a tail cone fairing 31, which fairings respectively are mounted over the front and rear openings of a hollow rocket pod 32 (shown in fragment) of the type used as housings for rocket carrying and launching devices on military and naval aircraft.

The specific configuration of the fairings depends upon competing aerodynamic and structural considerations. Aerodynamically, an ogival shape is to be preferred. Structurally, however, a configuration tending toward the spherical is desirable. The more spherically oriented the shape, the stronger the cone, and the thinner the walls can be, thus reducing the total weight of frangible material. A further advantage of a more spherical configuration, is that of a smaller frangible surface is exposed, again reducing the total weight of frangible material. In a preferred embodiment, the fairing is elliptical in configuration, representing the optimum compromise of the aerodynamic and structural considerations.

It is preferred that the fairing be molded out of resin impregnated wood-cellulose fiber. However, any material suitable for molding can be used. The molded structure is preferably made by accreting fibers from an aqueous slurry of fibers onto a porous screen or mold having the desired shape. The molded preform is then removed from the screen or mold and dried between heated male and female metal dies contoured to the shape of the molded piece with grooves in the male die to effect the formation of lines of lower fiber density.

The desired fragmentation pattern is provided by a fairing molded in the form of a thin-wall fiber shell with a systematic network of structural weaknesses. Specifically, the inner wall of the fairing is raised in certain areas. This results in a system of relatively thick and relatively thin areas in the fairing wall, the outer surface of which is always smooth for aerodynamic reasons.

The thinner areas are preferably of relatively high density fiber, and conversely, the thick areas are preferably of relatively low fiber density. Thus, because of distribution of the fiber in the fairing, it is pre-disposed to break at the weak points of relatively low fiber density.

This pre-disposition to break in certain areas is accentuated by impregnating the fairing with resin curable into a relatively brittle form. Because of the relatively lower density in the thicker areas, an excessive amount of resin collects in the thicker areas, thus, setting up shear lines due to the brittleness produced by the presence of the greater relative quantity of brittle resin.

The wall thickness of the molded fiber fairing will vary depending upon the structural requirements of the particular configuration used. Typically, in the thin areas, the walls are about 0.06 to 0.07 inch thick. The maximum thickness is from about 0.09 to 0.12 inch.

It is desirable that the fairing break into as small fragments as possible. Almost all skin damage is caused by large fragments, so it is preferable that the pieces obtained upon fragmentation be small, i.e., weights of the order of magnitude of a few grams. Thus, the areas of inherent structural weakness should be arranged so that the fragments that are typically produced weigh only a few grams.

A preferred structure for the nose and tail fairings is illustrated in FIG. 6. The nose fairing 30 is a one-piece, molded-fiber fairing with a smooth outer surface 33. The inner surface has a cross-network of circumferential ribs 34 and axial ribs 35. There is thus formed a grid pattern of approximately 2-inch squares of fiber with about a 0.06 inch wall thickness. The surrounding ribs are about ¼ inch wide and have a wall thickness of about 0.12 inch.

The tail cone fairing 31 is of three-piece construction, comprising shell 36 and hollow sections 37 and 38, the walls of which are preferably about 0.06 to 0.07 inch thick. The cross-network of ribs 34 and 35 is built into only the inner surface of shell 36. Shell 36 and sections 37 and 38 are joined at lap joint 39. In practice, the rear blast from the firing of the first rockets shatters shell 36 into small fragments. However, sections 37 and 38 remain attached to the rocket launcher and direct the escaping gases and debris in a linear rather than radial pattern and lessens the problem of damage to the aircraft.

A variation in fragmentation behavior of fairings may be achieved by dual resin impregnation. For example, nose area A may be impregnated with a brittle, phenolic resin, causing the ribbed zones of area A to be extremely brittle. The fibers of area B are impregnated with polystyrene solution, whereby the ribbed zones of area B are considerably less brittle than the ribbed zones of area A.

Suitable impregnating resins for area A are, for example, the thermosetting phenol-formaldehyde and melamine formaldehyde resins (e.g., a 30% by weight solution of phenol-formaldehyde, such as Le Bee LP–90) in isopropanol. Another example is Resinox 594 phenol-formaldehyde, 65% by weight in water-alcohol mixture diluted to 30% by weight using ethanol, 2-butanone or combinations thereof.

In the polystyrene impregnation of area B, a 14% solution of resin in toluene is typically used. The preferred resin to be used is a copolymer of styrene and minor amounts of butadiene (high impact polystyrene). Another useful resin is a terpolymer of styrene, acrylonitrile and butadiene. Yet another is polymerized methylmethacrylate.

Firing the rockets from the multirocket launcher housing results in immediate decapitation of area A. Area B, however, is destroyed by the blast of the rocket that has passed from the launcher. The fragmentation of area A into the desired small pieces can be attributed to two features of the invention. The first is the shear lines set up by the regions of varying fiber density. The second is the presence of the brittle resin which causes the molded article to be quite brittle along the predetermined shear lines and accentuates the tendency to break along the lines of differing fiber density because of its higher concentration in the regions of lower fiber density.

FIGURES 7, 8 and 8A illustrate male and female dies, between which the ribbed inner surface of the fairing cones aforedescribed and the consequent formation of zones or lines of lower fiber density are achieved in a molded fiber preform fitted into the space between the dies. The female die has a smooth, ellipsoidal, inner wall 41. It is surrounded by a cylinder 42 forming with die 40 an annular heating zone 43. One or more gas pipes 44, connected to a ring manifold 45 extending around the inside of one end of cylinder 42, supplies a combustible gas to the burner head 45. The flame 46 from head 45 impinges against flange 47, and the hot gases pass through heating zone 43 toward annular opening 48 and heat the die 40.

The male die 50 has a mating, ellipsoidal, outer surface interlaced by a series of diverging, axial grooves and circumferential grooves 53. These grooves allow expansion of the molded fiber preform to form the ribs aforedescribed on the inner surface of the nose and tail cones. The male die 50 is heated by a centrally located burner 54 comprising a hollow member 55 to which a combustible gas is fed via pipe 56. The member 55 has one or more burner heads 57 mounted in the wall thereof, from which issue the flame(s) for heating the male die.

The male and female dies are movable one with respect to the other. However, the male die is preferably fixed and the female die is movable axially over the male die. The flange 58 of the male die is mounted on a vacuum chamber 59. The die flanges 47 and 58 have a ring 60 therebetween made of brass or other suitable material to aid in proper spacing between the dies and sealing to permit suction to be drawn between the dies. The male die is provided with a number of drainage grooves 61 which extend from the apex to the base and empty into a circumferential space 62 which is connected by passageways 63 to vacuum space 64. The latter is connected to suitable suction means, e.g., a vacuum pump, not shown. The grooves 61 are small, usually around 0.060 inch deep and 0.040–0.060 inch wide. The grooves 52 are wider and deeper, e.g., half the thickness of the piece wide and 1/8 to 1/4 inch wide.

A specific example of the fibrous composition for the manufacture of preforms in accord with the invention is one composed of 70% sulphate cellulose fibers, 23% mechanical cellulose fibers (shredded wood) and 7% of other mechanical cellulose fibers (ground wood) with melamine-formaldehyde resin equal to 1.8% of the dry fiber weight.

For impregnation, the article may be submerged in a liquid composition composed of 30% phenol-formaldehyde resin in 70% isopropyl alcohol solvent for a minimum of 60 seconds. The impregnated article may be heated to 160° F. for 15 minutes to drive off the solvent, and the resin may be thereafter cured by placing the article in an oven at 350° F. for 20 minutes.

For polystyrene impregnation, the liquid composition may be composed of one pound of polystyrene resin dissolved in one gallon of toluene.

As a further specific example, the nose cone and tail cone fairings 30 and 31 of FIG. 6 are impregnated as follows. The phenolic impregnation bath comprises two volumes of an approximately 60% resin-modified phenol-formaldehyde resin dissolved in isopropyl alcohol and three parts by volume of isopropyl alcohol. The hydrometer reading of the bath should be about 21.0° Bé. and contains about 30% phenol-formaldehyde resin. The trade name of the aforesaid 60% resin-modified phenol-formaldehyde resin in isopropyl alcohol is $CR_4O_2$, Catalin Corporation of America.

Two polystyrene impregnation baths are prepared by dissolving polystyrene PS 330, Dow Chemical Company, in SC-Solvent 1–75 V., a blend of aromatics, naphthenes and paraffins, Central Solvents & Chemical Company. The concentration for the first dip bath is one of 50 pounds of the polystyrene in 40 gallons of the solvent, and after the resin is completely dissolved, 10 more gallons of the solvent are added to the solution to provide a concentration of one pound of the polystyrene per gallon solvent. The hydrometer reading is about 38.2° Bé. At 60° F. it contains about 13.0% polystyrene solids. The second polystyrene impregnation bath for the second dip is made in a similar manner with the same ingredients and has a concentration of three pounds of the polystyrene for five gallons of solvent. It contains about 8.2% polystyrene.

The front nose cones 30 are dipped in the phenolic impregnation bath, and a rolling motion is imparted thereto to insure uniform impregnation. After a short time interval, the dipped nose cones are removed and allowed to drain. The nose cone should be dipped for at least about one minute and preferably not more than two minutes. The nose cones are air dried, after which they are cured at 400° F. for 20 minutes. The hydrometer reading of the impregnation bath maintained within the range of about 20.6°–21.4° Bé.

For polystyrene impregnation, the parts to be impregnated with polystyrene resin are dipped for at least one minute and preferably not more than two minutes in the first dip bath, above described. They are removed, drained and air dried. The air dried parts are then given a quick dip in the above described second dip bath, after which they are drained and air dried.

The invention is hereby claimed as follows:

1. A process for preparing a fibrous article containing predetermined areas of lower fiber density than other areas adjacent thereto which comprises preparing a wet fibrous preform of substantially uniform fiber density and subjecting said wet preform to drying between heated, opposing dies, at least one of said dies having at least one cavity in the surface thereof which is brought in contact with a surface of said preform, said cavity being sufficiently large to allow the fibers of said preform to be distributed therein and cause the fiber density of said preform opposite said cavity to become measurably less than the fiber density in adjacent areas of said preform.

2. A process as claimed in claim 1 wherein said cavities comprise a plurality of elongated grooves.

3. A process as claimed in claim 1 wherein said preform is wetted by water, said dies are heated sufficiently to vaporize said water, and said vaporized water is withdrawn from the preform between said dies.

4. A process as claimed in claim 1 wherein the resultant fibrous article with areas of measurably different fiber density is impregnated with a liquid form of a synthetic resin, with the result that the areas of said preform of lower fiber density absorb greater amounts of said resin relative to the fiber weight in said areas than the absorbed amounts of resin relative to the fiber weight in areas having a greater fiber density.

5. A process as claimed in claim 4 wherein said liquid form is a solution of a thermosetting resin curable into a relatively brittle resin whereby said areas of lower fiber density and greater resin to fiber relative ratios are, upon curing of said resin, more brittle than the other areas.

6. A process as claimed in claim 4 wherein said liquid form is a solution in organic solvent of a thermoplastic resin.

7. A process for forming frangible, fibrous articles which comprises forming a fibrous article with areas of measurably lower fiber density than other areas of said article, impregnating said article with a liquid form of resin which is curable into a solid, brittle form, and forming by said impregnation a resin-impregnated article having measurably higher resin to fiber ratios in said areas of measurably lower fiber ratio than in said other areas, whereby said areas of high resin to fiber ratios are more brittle upon curing of said resin than are said impregnated, other areas.

8. A process as claimed in claim 7 wherein said areas of lower fiber density comprise a network of intersecting lines forming, upon said impregnation and curing, shear lines in said article.

References Cited by the Examiner

UNITED STATES PATENTS

| | | | |
|---|---|---|---|
| 2,760,881 | 8/1956 | Toulmin | 264—128 XR |
| 3,093,532 | 6/1963 | Miller et al. | 264—128 XR |
| 3,150,416 | 9/1964 | Such | 264—128 XR |

FOREIGN PATENTS

| | | |
|---|---|---|
| 578,034 | 6/1959 | Canada. |
| 1,054,532 | 4/1959 | Germany. |

ALFRED L. LEAVITT, *Primary Examiner.*

ROBERT F. WHITE, *Examiner.*

J. A. FINLAYSON, *Assistant Examiner.*